United States Patent [19]

Kilroy et al.

[11] Patent Number: 5,729,059
[45] Date of Patent: Mar. 17, 1998

[54] DIGITAL NO-BREAK POWER TRANSFER SYSTEM

[76] Inventors: Donald G. Kilroy, 7703 Laurel Cherry Dr., Rockford, Ill. 61108; Frank Joseph Ludicky, 1016 Ashdown Pl., Machesney Park, Ill. 61115

[21] Appl. No.: 481,012

[22] Filed: Jun. 7, 1995

[51] Int. Cl.$^6$ ................... H02J 1/00; H02J 7/00
[52] U.S. Cl. ................ 307/84; 307/64; 307/44; 307/85
[58] Field of Search ................ 307/43, 44, 64, 307/66, 84, 85, 86, 87, 80; 364/492

[56] References Cited

U.S. PATENT DOCUMENTS

| | | | |
|---|---|---|---|
| 3,887,820 | 6/1975 | Glennon | 307/87 |
| 4,403,292 | 9/1983 | Ejzak et al. | 364/492 |
| 4,754,161 | 6/1988 | Fox | 307/87 |
| 4,766,327 | 8/1988 | Fox | 307/87 |
| 4,797,570 | 1/1989 | Fox | 307/87 |
| 4,874,961 | 10/1989 | Henderson | 307/87 |
| 4,879,624 | 11/1989 | Jones et al. | 361/65 |
| 4,905,134 | 2/1990 | Recker et al. | 363/98 |
| 4,937,462 | 6/1990 | Recker et al. | 307/19 |
| 5,317,500 | 5/1994 | Iden et al. | 363/98 |
| 5,386,147 | 1/1995 | Bonneau et al. | 307/64 |

*Primary Examiner*—Richard T. Elms
*Assistant Examiner*—Jonathan S. Kaplan
*Attorney, Agent, or Firm*—Jeffery J. Makeever

[57] ABSTRACT

A power transfer control system for use in an AC electric power generation system comprises a generator control unit (GCU) which senses and controls the output of a generator, and a bus power control unit (BPCU) which communicates with the GCU to control and coordinate a power transfer between the generator and another source. Each unit communicates power transfer information, which eliminates the requirement of redundant sensing circuitry and wiring for the BPCU. The BPCU transmits master power control information and a synchronizing signal indicating a zero phase reference point of a control waveform to which the power transfer will take place. The GCU compares parameters of the output power of its respective source with the master power control information and the synchronizing signal. The GCU adjusts its generator's output to track the master power control information, and generates delta phase information representing the phase displacement between said synchronizing signal and the output power of the first source. It also generates a power ready signal when a difference between said sensed parameters of the output power and said master power control information is less than a predetermined threshold. When the BPCU receives this information from the GCU, it initiates a no-break power transfer if the delta phase information is less than a predetermined threshold. The synchronizing signal is sent at a given interval representing the zero crossing at a given frequency of the master waveform. The BPCU may adjust this transmission rate upon variances of the master waveform.

18 Claims, 5 Drawing Sheets

DIGITAL NO-BREAK POWER TRANSFER SYSTEM

FIELD OF THE INVENTION

The instant invention relates generally to electric power distribution no-break power transfer systems, and more particularly to no-break power transfer systems utilizing digital transmission of sensory data to centralize and control the transfer of power from one source to another without loss of power to the connected loads.

BACKGROUND ART

Electric power generation and distribution systems typically comprise multiple sources of electric power coupled though a distribution network to the utilization equipment. To satisfy safety and reliability requirements, the distribution network allows each source to be coupled to any load distribution bus to ensure constant availability of power to the utilization equipment so long as any source is on-line. The distribution system typically operates under a priority system which assigns a particular source with priority over a particular load distribution bus to ensure equal loading of the sources, e.g., each main generator has priority over its respective load distribution bus. As each primary source becomes available, a power transfer from the lower priority source is attempted. The control of the generator output power is accomplished by a generator control unit (GCU). The GCU senses the generator parameters and adjusts the frequency and voltage control to maintain the output power at the desired level. The power transfer and priority control is centralized in a bus power control unit (BPCU) which senses the output parameters of each power source to control the transfers.

To minimize disturbance to the utilization equipment, the higher and lower priority sources are momentarily paralleled as the higher priority source comes on line and the lower priority is taken off line, and when the higher priority source is taken off line to be replaced by the lower priority source. These types of transfers ensure that the system loads do not lose power during the event, and are termed no-break power transfers (NBPTs). The NBPT is accomplished by the BPCU by sensing the voltage magnitude, frequency, and phase displacement between each of the sources. When the differences of these parameters are all within prescribed limits, the contactor of the higher priority source is closed, temporarily bringing the two sources into parallel operation. Shortly thereafter, in an isolated system, the contactor of the lower priority source is opened, thus disconnecting it from the distribution bus. To minimize transient circulating current between the two sources, the difference between each of these measured parameters is controlled to a small value. Of particular importance is the phase difference between the sources because of its extreme contribution to the circulating current transients due to the vectorial nature which takes place as two multi-phase power sources are paralleled. The same process applies to systems which operate in parallel, except that once the higher priority source's contactor is closed, load division circuitry ensures continued parallel operation.

Electrical power generation and distribution systems for use on aircraft operate in like fashion. Airborne systems, however, must be qualified under much more extreme environmental conditions than most ground based systems. Recently, the requirements for the environmental conditions of high intensity radiated fields (HIRF) and multiple burst lightning strikes have been greatly increased. To meet these stringent environmental requirements for operation under HIRF and during multiple burst lightning strikes, return lines for all sense and discrete signal leads are required, in addition to the use of robust input electro-magnetic interference (EMI) filtering. For a conventional system where both the GCU and the BPCU sense the output parameters of the generators, the additional cost and weight resulting from this additional hardware in each of these control units is highly prohibitive. The problem is compounded in a multi-channel three phase system such as those utilized on commercial aircraft.

The instant invention is directed at overcoming this problem while providing a reliable NBPT system which meets all environmental requirements.

SUMMARY OF THE INVENTION

It is the principle objective of the instant invention to provide a new and improved no-break power transfer (NBPT) system. More particularly, it is the principle objective of the instant invention to provide a new and improved NBPT system which utilizes local analog sensing, digital communication, and centralized digital control of the NBPT event. It is a further objective of the instant invention to provide a NBPT system which utilizes a common time reference system to allow an accurate phase displacement determination to be made prior to the NBPT event. It is a still further objective of the instant invention to provide a NBPT system which eliminates redundant sensing of power parameters by multiple control units, thereby reducing the number of wires required by the system.

The power transfer control system of the instant invention is utilized in an AC electric power generation and distribution system having at least a two sources of AC power. Each of these sources are connectable to a load distribution bus through an associated switchable contactor. For the power transfer to be required, the second source of lower priority is initially connected to the load distribution bus and supplying it with electric power. The output power of a first source of higher priority is sensed and controlled by a generator control unit (GCU), and the opening and closing of at least one of the switchable contactors is controlled by a bus power control unit (BPCU). This system utilizes communication circuitry within the GCU and the BPCU to exchange power transfer related information between the units. This information includes master power control information and a synchronizing signal which indicates a zero phase reference point of the second, or master for this transfer, waveform. This allows the elimination of the redundant sensing wires and circuits within the BPCU.

The GCU contains circuitry for comparing parameters of the output power of the first source with the master power control information and synchronizing signal transmitted to it by the BPCU. The GCU compares the timing of the synchronizing signal to the phase of the sensed waveform and generates delta phase information. This information represents the phase displacement between the synchronizing signal and the output power of the first source. In essence, this represents the phase displacement between the first and second waveforms. The GCU further generates a power ready signal when the difference between the sensed parameters of the output power of the first source and the master power control information is less than a predetermined threshold. This information is transmitted to the BPCU which then controls a no-break power transfer between the two sources. This control ensures that the power ready signal has been received and that the delta phase information indicates that the phase displacement between the two sources is less than a predetermined threshold.

If the second source is a source of external power, the BPCU senses its output power parameters and establishes the master power control information and the synchronizing signal based on these sensed parameters. If the second source is a second generator controlled by a second GCU, however, the BPCU does not redundantly sense the output power parameters. Instead, the GCU senses the output parameters and compares its sensed waveform with the master power control information and the synchronizing signal. The GCU will control its output to the master power control information (frequency, phase, and possibly voltage level), and will transmit the delta phase information to the BPCU. The BPCU will then adjust the synchronizing signal to match the phase of the second source and transmit that information to the first source. In this way, the synchronizing signal indicates the zero crossing of the second waveform. As above, once the power ready signal is received and the delta phase information is less than the threshold, the BPCU will control the NBPT between the two sources.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 1:
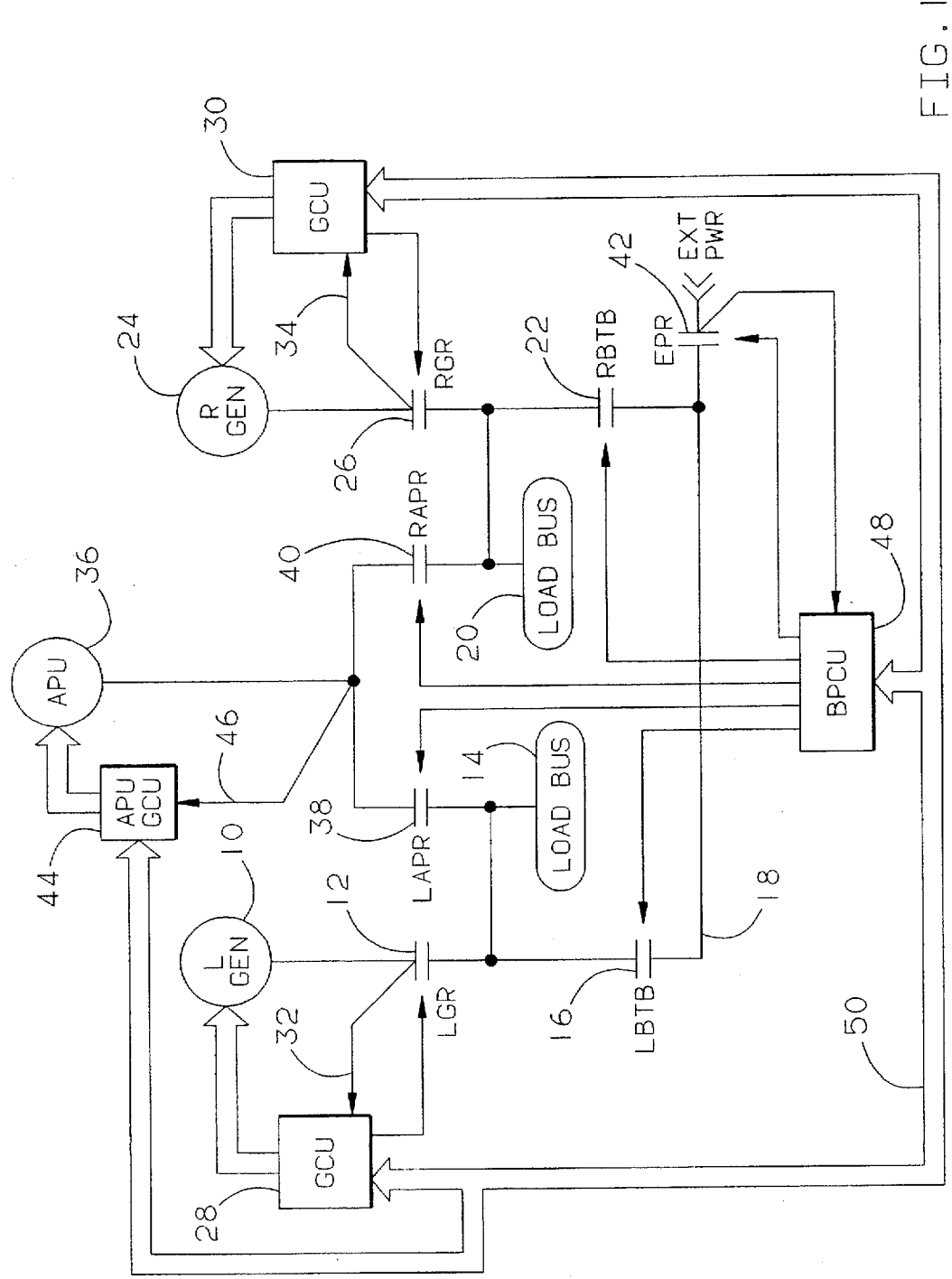
FIG. 1 is a single line diagram of an electric power generation and distribution system embodying the instant invention.

As illustrated in FIG. 1, an electric power generation system (EPGS) comprises multiple sources of electric power coupled through a distribution network which is designed to allow power to be supplied to any load distribution bus regardless of source availability. The EPGS illustrated in FIG. 1 is particularly well suited for use on a two engine aircraft, and will be used as an exemplary system to describe the instant invention. This exemplary system comprises a left engine driven generator 10 coupled by a left generator relay (LGR) 12 to a left load distribution bus 14, and by a left bus tie breaker (LBTB) 16 to a tie bus 18. The tie bus 18 allows the left generator to power the right load distribution bus 20 when the right bus tie breaker (RBTB) 22 is closed. As with the left side of the system, the right generator 24 may also supply power to its bus 20 through the right generator relay (RGR) 26. An auxiliary power unit (APU) driven generator 36 may also be provided to supply power to either the left or the right distribution buses 14 or 20 through a left auxiliary power relay (LAPR) 38 and a right auxiliary power relay (RAPR) 40. Additionally, when the aircraft is on the ground, power may be supplied by a source of external power through an external power relay (EPR) 42.

The control of the output power of the engine driven generators 10 and 24 is accomplished by generator control units (GCUs) 28 and 30. These GCUs 28 and 30 sense the generator output power at a point of regulation (POR) via lines 32 and 34 and adjust their voltage and frequency control to maintain power at desired limits. These GCUs 28 and 30 also control the connection of the generators 10 and 24 to the load distribution buses by controlling the opening and closing of the LGR 12 and the RGR 26. The control of the output power of the APU driven generator 36 is accomplished by an APU generator control unit (APU GCU) 44 which also senses the generator output power at a point of regulation via line 46. The control of the connection to the load distribution buses 14 and 20, however, is accomplished through the bus power control unit (BPCU) 48. This BPCU 48 also controls the connection of the external power to the tie bus 18 by control of the EPR 42 upon sensing that the external power parameters are within acceptable limits. Additionally, the BPCU 48 controls the cross coupling of the right or left generator 24 or 10 to the left or right distribution bus 14 or 20 by controlling the opening and closing of the BTBs 16 and 22.

As described above, prior systems required that the BPCU sense the power parameters of each source directly to enable it to coordinate the reconfiguration of available sources which greatly increased the number of wires required by the system. In a preferred embodiment of the instant invention, however, the BPCU 48 does not have to sense each source of power directly. Instead, the BPCU 48 communicates with the GCUs 28 and 30, and with the APU GCU 44 via a bidirectional communication bus 50 to determine the suitability of the particular source for transfer to a particular distribution bus. This greatly reduces the complexity and weight of the BPCU 48, and the system as a whole. While digital communication has been used for many functions on aircraft in the past, it has not been used to control no-break power transfers (NBPTs) because of the cost and complexity associated with providing a system capable of relaying accurate phase displacement information of two dynamic electrical waveforms. Without accurate phase displacement information available at the time of paralleling, large circulating currents may be generated between the two sources, potentially many times the rated current flow which could damage the generation equipment or the external power source.

Figure 2:
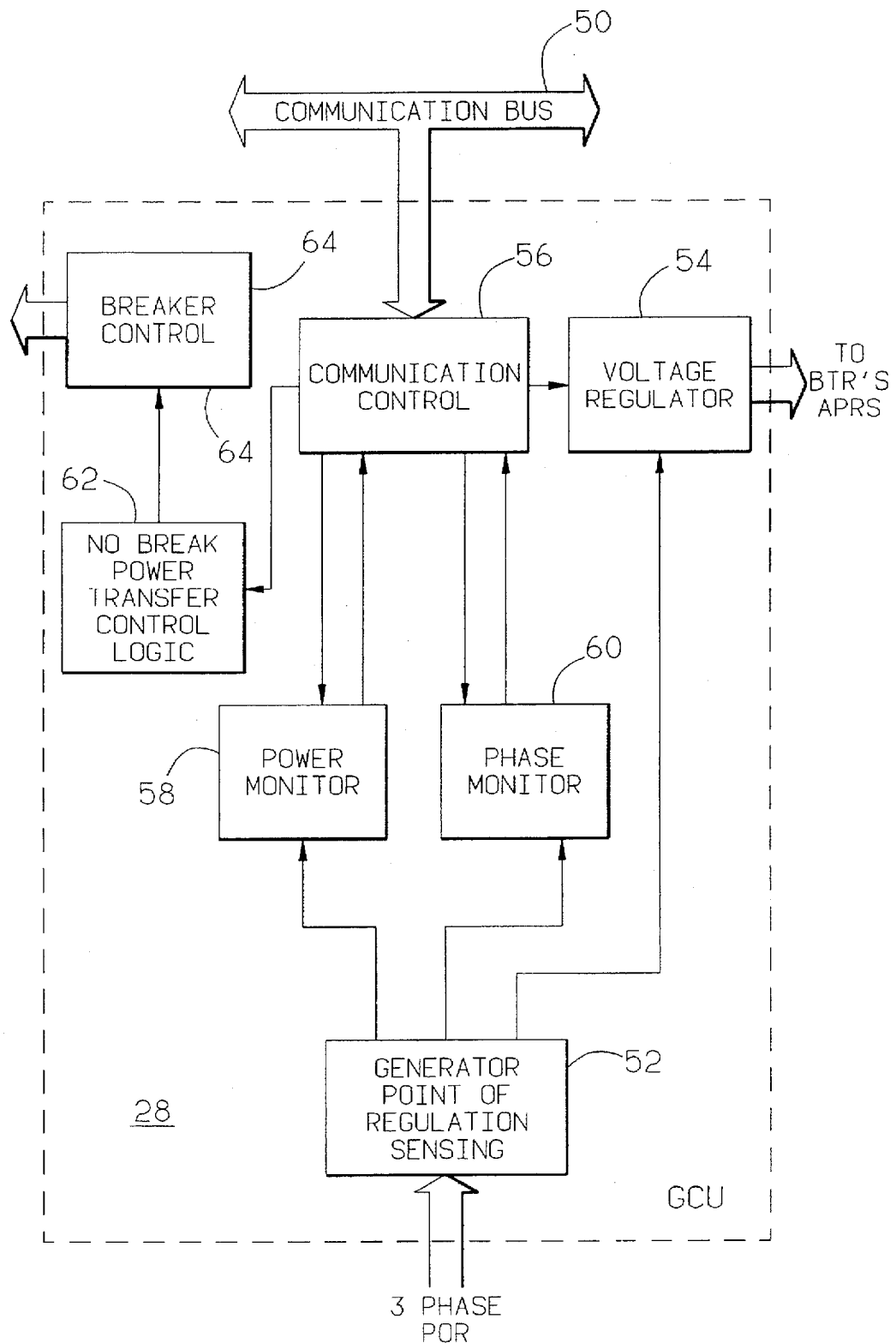
FIG. 2 is a single line block diagram of the generator control unit interface for the NBPT system of the instant invention.

An understanding of the functionality of the GCU 28 may be gained with reference to FIG. 2 which illustrates the GCU 28 in greater detail. As used throughout this description, the term circuitry will be used to describe various functional areas of the instant invention. This is not meant to limit the scope of the invention to analog implementations only, as the instant invention may be practiced through a software, firmware, application specific integrated circuit (ASIC), programmable logic array, etc. implementation. The GCU 28 of the instant invention utilizes voltage sensing circuitry 52 to sense the output voltage of its associated generator 10 (FIG. 1) at a point of regulation (POR). This POR is typically located near the utilization equipment to minimize the effect of feeder impedance on the power quality of the delivered power. The sensing circuitry 52 communicates the sensed voltage to a voltage regulator 54 which uses this as a feedback control of the excitation of the generator 10.

During a power transfer event, the voltage regulator may also receive master power control information from the communication control circuitry 56 as commanded by the BPCU 48 (FIG. 1) over the bidirectional communication bus 50. In response to this information, the voltage regulator 54 adjusts the generator excitation to match the sensed POR voltage to that commanded by the master power control information.

The GCU's POR sensing circuitry 52 also communicates the generator's sensed voltage and frequency levels to internal power monitor circuitry 58. This circuitry 58 compares the sensed voltage and frequency with the voltage and frequency information contained in the master power control information transmitted by the BPCU 48. The power monitor circuitry 58 compares this master power control information with the sensed POR information and generates a power ready signal when the difference between the two is less than a predetermined threshold. The thresholds for voltage and frequency difference may be set to appropriate values based on source impedance and power rating, being dependant on the amount of peak circulating current which may be tolerated by the system. Preferably these thresholds are set to a value of less than five (5) volts and less than two (2) Hertz difference. Once calculated, the power ready signal is communicated to the BPCU 48 via the communication control circuitry 56. Alternatively, the GCU 28 may simply transmit power information (voltage, frequency, and phase relationship as described hereinbelow) to the BPCU 48 to allow it to calculate the power ready conditions. This allows the BPCU to close the loop for the NBPT control.

The sensing circuitry 52 communicates the sensed voltage waveform to a phase monitor circuit 60. This circuit calculates the phase displacement, or delta phase, between the synchronizing signal and its generator's output waveform. The synchronizing signal indicates to the phase monitor 60 a zero crossing of the master waveform (the waveform to which the GCU 28 is to control its generator's output). The phase monitor 60 then calculates the amount of time until its generator's output waveform crosses zero volts to determine the amount of phase difference between the two. This delta phase information is then passed to the communication control circuitry 56 where it is sent to the BPCU 48 over the communication bus 50.

This process is continued in the GCU 28 until the BPCU 48 determines that the NBPT conditions have been satisfied. At that point, if the direction of the power transfer is to the generator 10, the BPCU 48 communicates a power transfer ready signal to the GCU 28 which is passed to the no-break power transfer control logic 62. The control logic 62 then commands the breaker control circuitry 64 to close the associated generator relay 12 (FIG. 1). If the direction of the power transfer is away from the generator, e.g., from the generator 10 to the APU 36 (FIG. 1), the BPCU closes the APR 38 and the GCU, upon sensing the closure, trips the GR 12.

Figure 3:
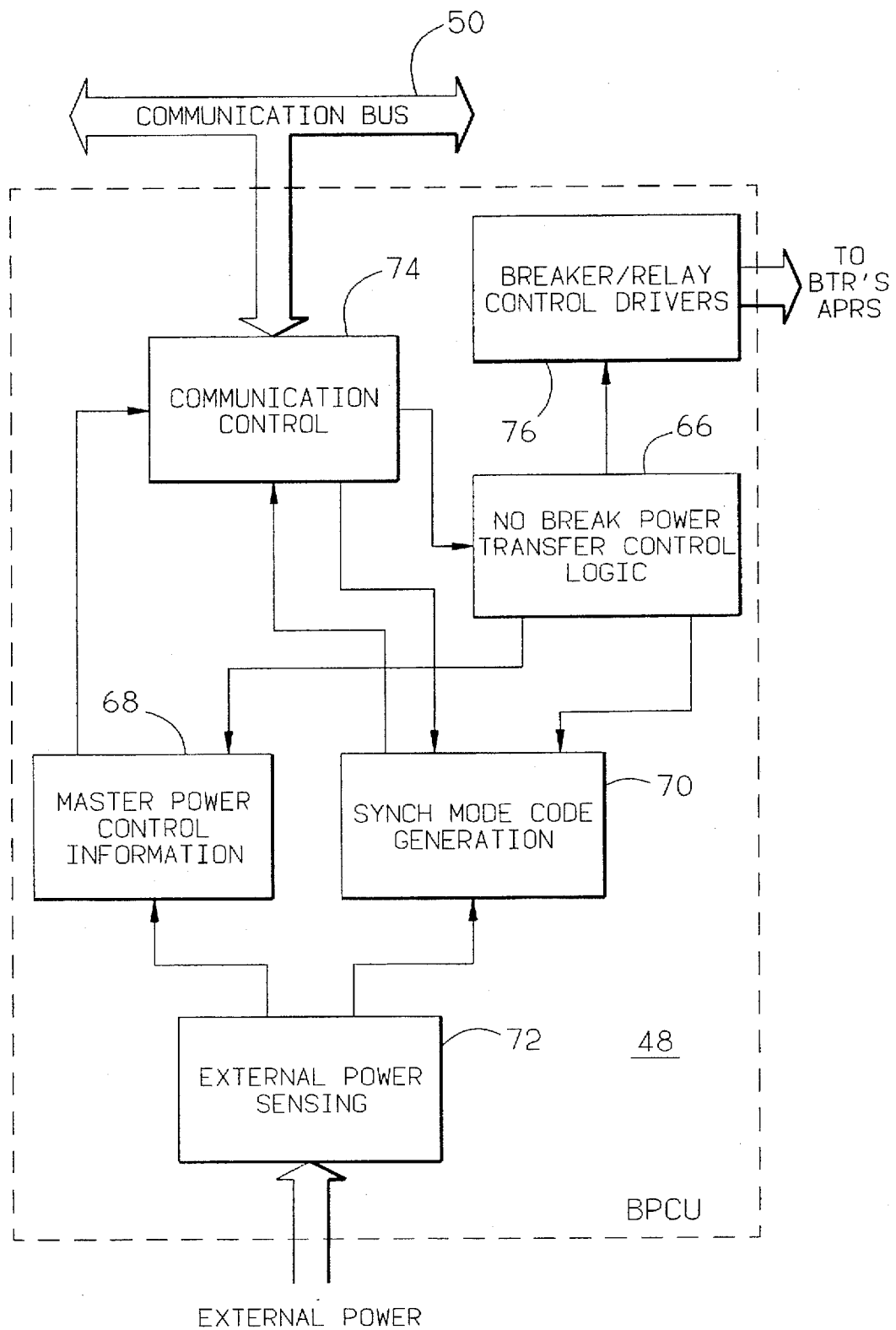
FIG. 3 is a single line block diagram of the bus power control unit interface for the NBPT system of the instant invention.

The operation of the BPCU 48 may be better understood with reference to FIG. 3 which illustrates the BPCU 48 in greater detail. When a no-break power transfer is requested, the NBPT control logic 66 determines the origin of the master control waveform, i.e. whether the waveform to which the GCUs will control their generator's output will be based on the external power or on an internally generated waveform. This information is communicated to the master power control information control circuit 68 and the synchronizing control circuit 70. If the power transfer involves the external power, waveform information from an external power sensing circuit 72 is utilized. The master power control information control circuit 68 then processes the voltage and frequency information of the external power waveform and passes this information to the communication control circuitry 74. Likewise, the synchronizing control circuitry 70 analyzes the external power waveform to determine the zero crosses and thus the generation of the synchronizing signal. This is also passed to the communication control circuitry 74. Both the synchronizing signal and the master power control information are then sent to the GCU via the communication bus 50. The NBPT control circuitry 66 also controls the opening and closing of the bus tie breakers 16 and 22, the auxiliary power relays 38 and 40, and the external power relay 42 (see FIG. 1) through the breaker/relay control drivers 76.

Figure 4:
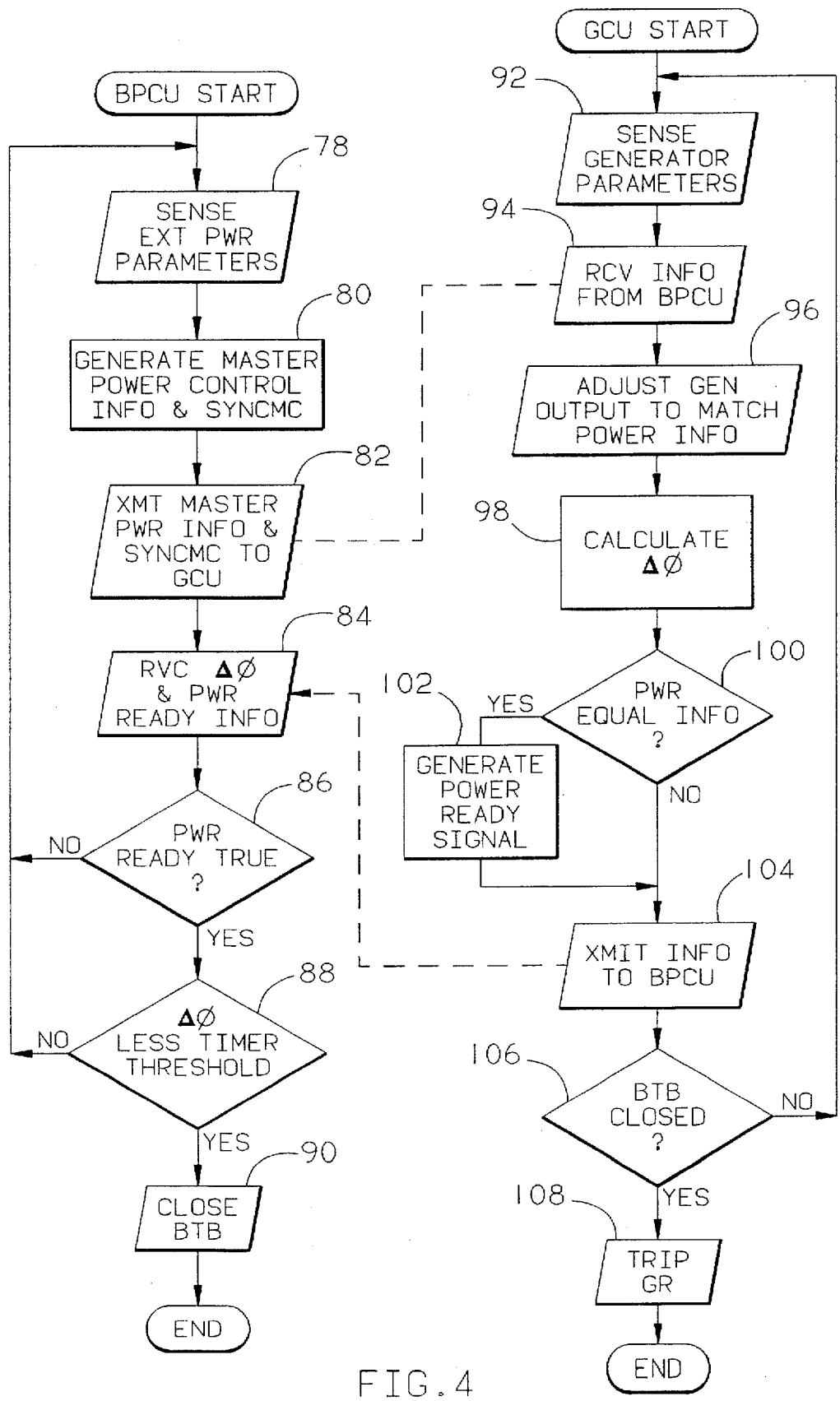
FIG. 4 is a process flow diagram illustrating an exemplary NBPT from a main channel generator to a source of external power.

The relationship and interaction between the BPCU 48 and the GCU 28 as part of the instant invention is made clear with reference to FIG. 4 which illustrates an exemplary NBPT from the generator 10 to the external power. The initial configuration of the system, referring to FIG. 1, is the LGR 12 is closed allowing the generator 10 to supply power to the load bus 14, the EPR 42 closed allowing the external power to supply power to the tie bus 18, and the LBTR 16 open. Upon initiating the power transfer, which may, for example, be due to an engine shutdown, the BPCU senses the external power parameters 78. The BPCU then processes this information and generates the master power control information and the synchronizing signal 80. This information is transmitted to the GCU 82 at a rate which is synchronized to the zero crossings of the external power waveform. The transmit rate will, therefore, vary with the frequency of the sensed (master) waveform. Once the GCU processes this information, as described hereinbelow, the BPCU receives delta phase information and power ready information 84. Once the power ready signal is sent 86 and the delta phase is less than a predetermined threshold 88, the BPCU closes the LBTB 90 to parallel the external power with the generator. If either the power ready signal has not been received or the delta phase is larger than the threshold, the BPCU will not close the LBTB.

During this transfer the GCU senses the generator output parameters 92. When the master power control information and the synchronizing are received 94, the GCU adjusts the speed 96 of the generator to control its output based on the master power control information. The GCU then calculates the delta phase information 98 and checks to see if the generator output is within acceptable limits of the master power control information 100. If it is within acceptable limits, the GCU generates a power ready signal 102 to be transmitted to the BPCU 104 along with the delta phase information. If the BPCU has closed the BTB as sensed by the GCU 106 or alternatively as communicated to the GCU by the BPCU (not shown), the GCU trips the LGR 108 to complete the transfer from the generator to the external power. If not, the process continues until complete.

Figure 5:
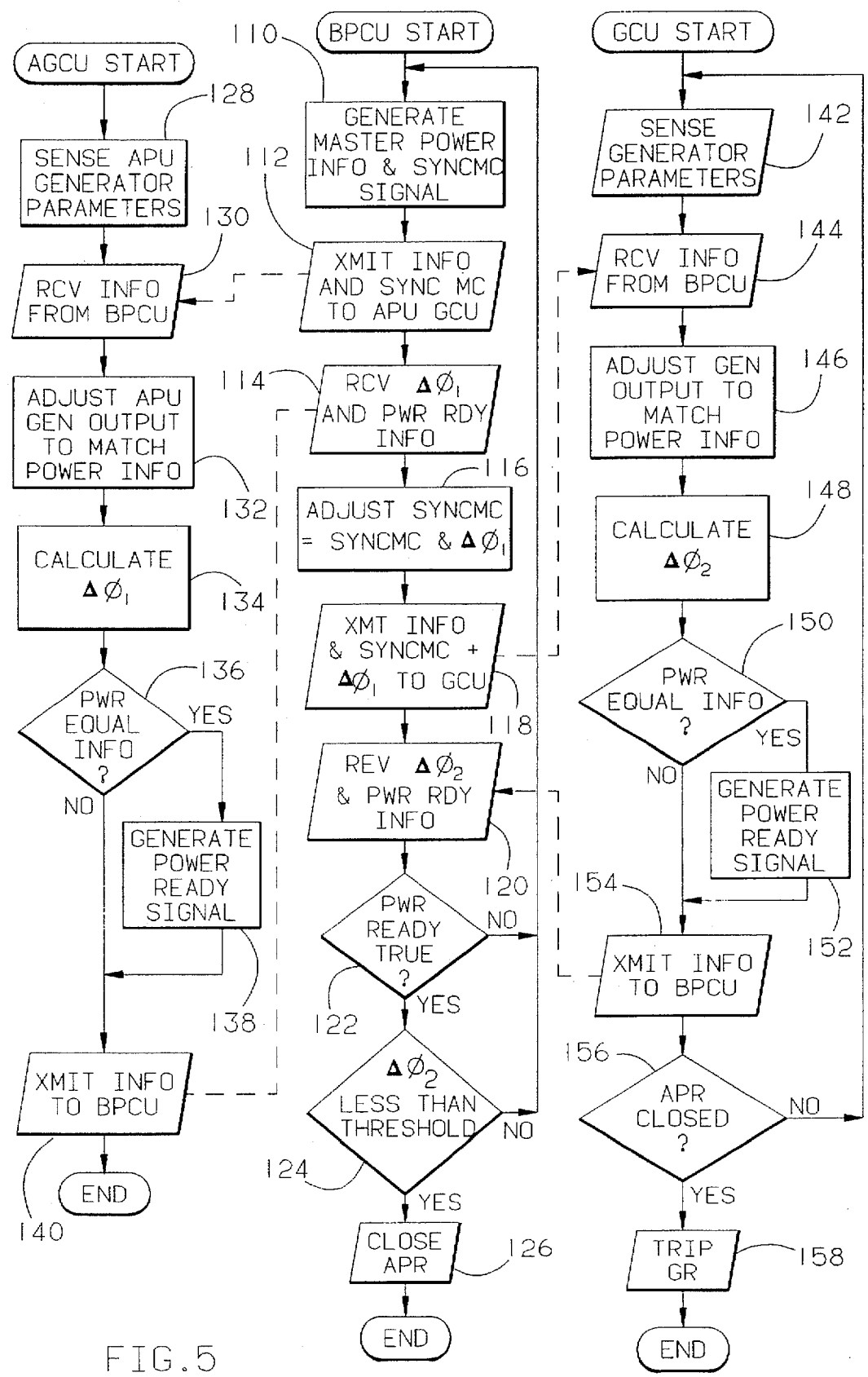
FIG. 5 is a process flow diagram illustrating an exemplary NBPT from a main channel generator to an APU mounted generator.

The next exemplary NBPT involves a transfer from the generator 10 to the APU generator 36. In this transfer, the BPCU will be using the APU generator as the master to which the main generator will be controlled. This presents a unique problem, however, since the BPCU 48 does not actually sense the APU generator's output nor does the APU GCU typically have control of the APU GEN's frequency. As illustrated in FIG. 5, however, the BPCU internally generates master power control information of 115 volts and 400 hertz (for aircraft applications) and a synchronizing signal 110. This information is then transmitted to the APU GCU 112. The APU GCU processes this information as will be described hereinbelow. When the BPCU receives frequency, delta phase information, and power ready information from the APU GCU 114, the BPCU adjusts the synchronizing signal to eliminate the delta phase information 116, i.e. it time shifts the synchronizing signal to synchronize its generation with a zero cross of the APU generator's output. This information is then transmitted to the GCU 118. When a delta phase information and power ready information is received from the GCU 120, the BPCU checks to see if the power ready signal is true 122 and that the delta phase is less than a predetermined threshold 124. If they are, the BPCU closes the LAPR to bring the two sources into parallel 126. If not, the process repeats.

During this process, the APU GCU is sensing its generator's output 128. Once the master power control information and the initial synchronizing signal are received from the BPCU 130, the APU GCU adjusts the voltage of the generator to minimize the error between the output and the information received 132. The APU GCU calculates delta phase information 134, and determines if the output power is within acceptable limits of the master power control information 136. The APU GCU may mask out the frequency related information from the power ready calculation since it typically does not have control over the frequency of the APU GEN. If the output power is within acceptable limits, the APU GCU generates a power ready signal 138 and transmits it with the delta phase information to the BPCU 140. If it is not, this signal is not generated.

The main channel GCU operates the same as described above with respect to the generator to external power transfer. The GCU senses the generator output 142. When the master power control information and the synchronizing are received 144, the GCU adjusts the excitation to the generator to control its output based on the master power control information 146. The GCU may continue to operate in this synchronized but isolated mode for an extended period of time once the APU GEN is available. This will allow the GCU to complete a NBPT immediately upon command of the transfer, as well as removing any beat frequency effects resulting from continued unsynchronized operation of both sources of power. The GCU also calculates the delta phase information 148 and checks to see if the generator output is within acceptable limits of the master power control information 150. If it is within acceptable limits, the GCU generates a power ready signal 152 to be transmitted to the BPCU 154 along with the delta phase information. If the BPCU has closed the LAPR 156, the GCU trips the LGR 158 to complete the transfer from the generator to the auxiliary power unit generator. If not, the process continues until complete.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive rights of all modifications which come within the scope of the appended claims is reserved.

I claim:

1. A power transfer control system for use in an AC electric power generation and distribution system having at least a first source and a second source of AC power, each of the sources being connectable to a load distribution bus through an associated switchable contactor, the second source being initially connected to the load distribution bus and supplying power thereto, the output power of at least the first source being sensed and controlled by a first generator control unit (GCU), the opening and closing of at least one of the switchable contactors being controlled by a bus power control unit (BPCU), comprising:

first means within the BPCU for communicating with the GCU, said first means transmitting information to the first GCU including master power control information and a synchronizing signal indicating a zero phase reference point;

second means within the first GCU for communicating with the BPCU;

third means within the first GCU for comparing parameters of the output power of the first source with said master power control information and said synchronizing signal, said third means generating delta phase information representing the phase displacement between said synchronizing signal and the output power of the first source, said third means further generating a power ready signal when a difference between said sensed parameters of the output power and said master power control information is less than a predetermined threshold; and wherein said second means transmits said delta phase information and said power ready signal to the BPCU; and wherein a no-break power transfer is accomplished in response to the receipt of said power ready signal and said delta phase information being less than a predetermined threshold.

2. The control system of claim 1, wherein the BPCU senses output parameters of the second source, and wherein said master power control information contains target frequency information representing a frequency of the second source, and whereby the first GCU adjusts output frequency of the first source to minimize the error therebetween.

3. The control system of claim 2, wherein said synchronizing signal is transmitted at a rate corresponding to a period of said target frequency.

4. The control system of claim 1 including a second GCU sensing and controlling output power of the second source, further comprising:

fourth means within the BPCU for communicating with the second GCU, said fourth means transmitting information to the second GCU including a synchronizing signal indicating a zero phase reference point;

fifth means within the second GCU for communicating with the BPCU;

sixth means within the second GCU for comparing parameters of the output power of the second source with said synchronizing signal, said sixth means generating delta phase information representing the phase displacement between said synchronizing signal and the output power of the second source, said delta phase information being communicated to the BPCU by said fifth means; and wherein the BPCU shifts said synchronizing signal in time to compensate for said delta phase information from said second GCU, whereby said synchronizing signal communicated to the first GCU represents a zero reference point of the output power of the second source.

5. The control system of claim 1, wherein the BPCU varies a period of transmission of said synchronizing signal in response to a variance of frequency of the second source.

6. An electric power generation and distribution system having source paralleling capability, comprising:

a first source of electric power;

a first source controller for controlling the AC power of said first source, said first controller sensing parameters of said AC power produced thereby;

a second source of electric power supplying AC power to a distribution bus;

first means for selectively coupling and decoupling said first source and said second source to and from said distribution bus;

a bus controller for controlling said first means, wherein said bus controller transmits master power control information and a synchronizing signal to said first source controller; and wherein said first source controller controls said AC power to minimize error between said parameters sensed by said first source controller and said master power control information, said first source controller transmitting a power ready signal to said bus controller when said error is less than a predetermined threshold; and wherein said first source controller transmits delta phase information to said bus controller representing a phase difference between said synchronizing signal and said AC power output of said first source; and wherein said bus controller commands said first means to couple said first source to said distribution bus in response to said power ready signal and said delta phase information being less than a predetermined threshold, said first source and said second source being brought into parallel thereby.

7. The system of claim 6, wherein the bus controller senses output parameters of the second source, and wherein said master power control information contains target frequency information representing a frequency of the second source, and whereby the first source controller adjusts output frequency of the first source to minimize the error therebetween.

8. The system of claim 7, wherein said synchronizing signal is transmitted at a rate corresponding to a period of said target frequency.

9. The system of claim 6, further comprising:

a second source controller sensing and controlling output power of said second source;

second means within said bus controller for communicating with said second source controller, said second means transmitting information to said second GCU including a synchronizing signal indicating a zero phase reference point;

fifth means within said second source controller for communicating with said bus controller;

sixth means within said second source controller for comparing parameters of the output power of the second source with said synchronizing signal, said sixth means generating delta phase information representing the phase displacement between said synchronizing signal and the output power of the second source, said delta phase information being communicated to the BPCU by said fifth means; and wherein the BPCU shifts said synchronizing signal in time to compensate for said delta phase information from said second GCU, whereby said synchronizing signal communicated to the first GCU represents a zero reference point of the output power of the second source.

10. The control system of claim 6, wherein the BPCU varies a period of transmission of said synchronizing signal in response to a variance of frequency of the second source.

11. A method of paralleling two AC power sources, a power output of at least one of the AC power sources being controlled by a source controller, comprising:

transmitting master power control information from a bus power control unit to the source controller, the source controller adjusting the power output of the power source being controlled in response thereto to minimize air there between, the source controller transmitting the power ready when said air is less than a predetermined threshold to the bus power control unit;

transmitting the synchronizing signal at a predetermined rate from the bus power control unit to the source controller to indicate a zero phase reference point, the source controller calculating delta phase information between said synchronizing signal and the power output wave form and transmitting same to the bus power control units;

and paralleling the two AC power sources in response to said power ready signal in the delta phase information being less than a predetermined threshold.

12. The method of claim 11, further including the steps of:

transmitting the master power control information to a second source controller, the second source controller adjusting the power output of the other power source in response thereto to minimize error therebetween, the second source controller transmitting a second power ready signal to the bus power control unit when the error is less than a predetermined threshold;

transmitting the synchronizing signal at a predetermined rate from the bus power control unit to the second source controller to indicate a zero phase reference point, the source controller calculating delta phase information between the synchronizing signal and the power output waveform and transmitting same to the bus power control unit; and adjusting transmission timing of the synchronizing signal in response to the delta phase information from the second source controller to synchronize transmission of the synchronizing signal with the zero crosses of the output power waveform of the second source.

13. The method of claim 11, further comprising the step of adjusting the rate of transmission of the synchronizing signal in response to a change in frequency of the second source.

14. A power transfer control system for use in an AC electric power generation and distribution system having at least a first source and a second source of AC power, each of the sources being connectable to a load distribution bus through an associated switchable contactor, the second source being initially connected to the load distribution bus and supplying power thereto, the output power of at least the first source being sensed and controlled by a first generator control unit (GCU), the opening and closing of at least one of the switchable contactors being controlled by a bus power control unit (BPCU), comprising:

first means within the BPCU for communicating with the GCU, said first means transmitting information to the first GCU including master power control information and a synchronizing signal indicating a zero phase reference point;

second means within the first GCU for communicating with the BPCU;

third means within the first GCU for comparing parameters of the output power of the first source with said synchronizing signal, said third means generating delta phase information representing the phase displacement between said synchronizing signal and the output power of the first source; and wherein said second means transmits said delta phase information and said parameters of the output power to the BPCU;

fourth means within the BPCU for comparing said parameters of the output power with said master power control information; and wherein the BPCU commands a no-break power transfer if said delta phase information and a difference between said parameters of the output power and said master power control information are less than predetermined thresholds.

15. The control system of claim 14, wherein the BPCU senses output parameters of the second source, and wherein said master power control information contains target frequency information representing a frequency of the second source, and whereby the first GCU adjusts output frequency of the first source to minimize the error therebetween.

16. The control system of claim 15, wherein said synchronizing signal is transmitted at a rate corresponding to a period of said target frequency.

17. The control system of claim 14, including a second GCU sensing and controlling output power of the second source, further comprising:

fifth means within the BPCU for communicating with the second GCU, said fifth means transmitting information to the second GCU including a synchronizing signal indicating a zero phase reference point;

sixth means within the second GCU for communicating with the BPCU;

seventh means within the second GCU for comparing parameters of the output power of the second source with said synchronizing signal, said seventh means generating delta phase information representing the phase displacement between said synchronizing signal and the output power of the second source, said delta phase information being communicated to the BPCU by said sixth means; and wherein the BPCU shifts said synchronizing signal in time to compensate for said delta phase information from said second GCU, whereby said synchronizing signal communicated to the first GCU represents a zero reference point of the output power of the second source.

18. The control system of claim 14, wherein the BPCU varies a period of transmission of said synchronizing signal in response to a variance of frequency of the second source.

* * * * *